United States Patent [19]

Norling et al.

[11] Patent Number: 5,212,984

[45] Date of Patent: May 25, 1993

[54] MOUNTING SYSTEM FOR AN ACCELEROMETER

[75] Inventors: Brian L. Norling, Mill Creek; Jeffrey F. Tonn, Tacoma, both of Wash.

[73] Assignee: Sundstrand Corporation, Rockford, Ill.

[21] Appl. No.: 930,473

[22] Filed: Aug. 13, 1992

Related U.S. Application Data

[63] Continuation of Ser. No. 717,853, Jan. 22, 1988, abandoned, which is a continuation of Ser. No. 879,676, Jun. 27, 1986, abandoned, which is a continuation-in-part of Ser. No. 676,724, Nov. 30, 1984, abandoned.

[51] Int. Cl.$^5$ .................................................. G01P 15/00
[52] U.S. Cl. ................................... 73/493; 73/497; 73/514; 248/694
[58] Field of Search ............. 73/493, 497, 514, 517 R, 73/517 AV, 866.5; 310/346, 377, 353; 248/611, 612, 27.3, 694, 904

[56] References Cited

U.S. PATENT DOCUMENTS

| | | | |
|---|---|---|---|
| 3,601,343 | 8/1971 | Sivaslian | 248/1 |
| 4,190,782 | 2/1980 | Guess | 310/346 |
| 4,266,157 | 5/1981 | Peters | 310/346 |
| 4,467,651 | 8/1984 | Peters et al. | 73/497 |

Primary Examiner—John E. Chapman
Attorney, Agent, or Firm—Fitch, Even, Tabin & Flannery

[57] ABSTRACT

The mounting system of the present invention is adapted to support a precision transducer (14) in spaced alignment with a supporting case (12). The mounting system comprises a plurality of mounting elements (30), each mounting element having one end (34), an opposite end (32) and a resilient intermediate portion (36). One end is adapted to be connected to the transducer, and the opposite end is adapted to be connected to the case. Adjacent mounting elements are joined to one another by bridge sections (38) to form a continuous mounting ring (16) and to define a plurality of gaps (56). At least the end connected to the transducer and bridge sections is composed of a substance that has a coefficient of thermal expansion approximately equal to the coefficient of thermal expansion of the transducer. Each intermediate portion is configured to provide a low resistance to relative movement between the transducer and case in a radial direction, and a high resistance to relative movement in other directions.

11 Claims, 4 Drawing Sheets

MOUNTING SYSTEM FOR AN ACCELEROMETER

This application is a continuation of application Ser. No. 07/717,853 filed Jan. 22, 1988, abandoned, which application is a continuation of Ser. No. 06/879,676 filed on Jun. 27, 1986, now abandoned, which application is a continuation-in-part of Ser. No. 06/676,724 filed on Nov. 30, 1984, abandoned.

TECHNICAL FIELD

The present invention relates to mounting systems for precision transducers and, in particular, to a stress-free mounting system for a transducer such as an accelerometer.

BACKGROUND OF THE INVENTION

It is often necessary to isolate a precision transducer from external stress. Such stress may be caused by mechanical distortion of the case or other structure to which the transducer is mounted, or by differential thermal expansion or contraction between the transducer and the case. Isolation from external stress can in principle be achieved by using a compliant mounting system. However, a compliant mounting system will not in general provide precise and stable alignment of the transducer with respect to its case. For many transducers, such alignment is critical for achieving proper operation. A compliant mounting system may also result in unwanted mechanical oscillation of the transducer when the case is exposed to vibration.

One type of precision transducer that is especially susceptible to external stress is an accelerometer. This is due, in part, to the extreme level of accuracy being sought. An accelerometer is an example of an instrument that must not be allowed to change position or vibrate with respect to its case. One prior accelerometer mounting technique has been to connect the accelerometer to the case by means of a metal ring or by means of a structural adhesive such as an epoxy resin. These prior non-compliant mounting techniques result in stress being transmitted to the accelerometer due to differential thermal expansion between the accelerometer and the mounting ring and case. These prior techniques also transmit stress to the accelerometer when the case is subjected to mechanical distortion. Distortion can be induced by mounting the case to a surrounding support, or by differential thermal expansion between the case and the support. Dimensional instabilities in epoxy joining materials can occur, especially at elevated temperatures. All such stresses may affect the output of a precision accelerometer, and may result in reduced stability. The temperature induced stresses also may lead to increased variation of accelerometer output with temperature, and may create thermally induced errors in the accelerometer output. Thus, an improved mounting system for a precision transducer would be an advance in the art that would be greatly welcomed.

SUMMARY OF THE INVENTION

The present invention provides a mounting system for a precision transducer such as an accelerometer. The mounting system is compliant to differential volumetric expansion but rigid against rotation or translation of the transducer with respect to the case.

In the preferred embodiment, the mounting system of the present invention is adapted to support a precision transducer in spaced alignment with a supporting case. The mounting system comprises a plurality of mounting elements, each mounting element having first and second ends and a resilient intermediate portion. The first end of each mounting element is connected to the transducer, and the second end of each mounting element is connected to the case. Adjacent mounting elements are preferably joined to one another by bridge sections to form a mounting ring or band. In one embodiment the band has a continuous, inwardly facing mounting surface formed by the first ends and the bridge sections. The second ends of adjacent mounting elements are preferably axially separated from the first ends and circumferentially separated from the second ends of the adjacent mounting elements by gaps. In another embodiment, the first end and the second end of each mounting element lie in the same plane and are circumferentially separated from each other by gaps. In both embodiments at least the first ends and the bridge sections are composed of a substance that has a coefficient of thermal expansion approximately equal to the coefficient of thermal expansion of the transducer. The intermediate portion of each mounting means is adapted to provide a low resistance to relative movement between the transducer and the case in a radial direction, and a high resistance to relative movement between the transducer and the case in directions normal to the radial direction. Differential thermal expansion between the transducer and the case therefore does not apply stress to the transducer, or cause misalignment between the transducer and the case.

Numerous advantages and features of the present invention will become readily apparent from the following detailed description of the invention and the embodiments thereof, from the claims and from the accompanying drawings.

DETAILED DESCRIPTION OF THE INVENTION

Figure 1:
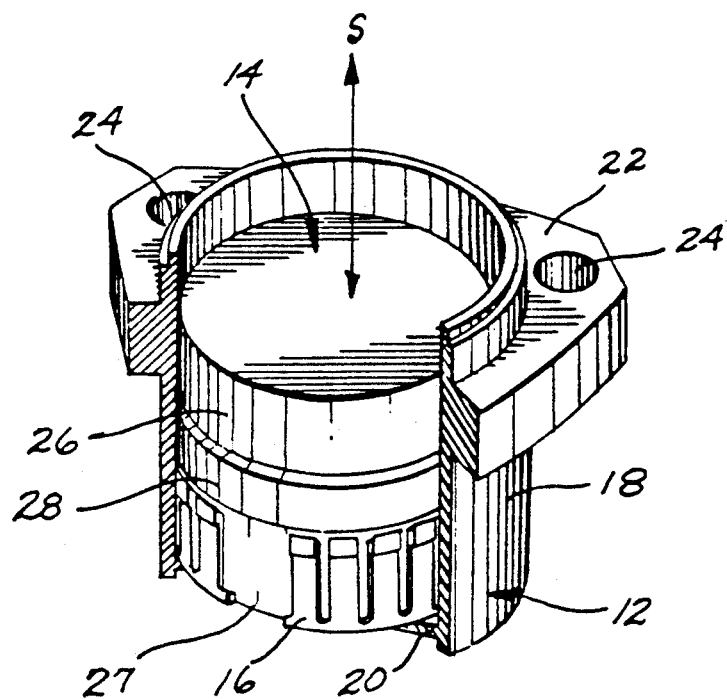
FIG. 1 is a perspective view of an accelerometer mounted in a case by the mounting system of the present invention.

While this invention is susceptible of embodiment in many different forms, there is shown in the drawings and will herein describe in detail several preferred embodiments of the invention. It should be understood, however, that the present disclosure is to be considered an exemplification of the principles of the invention and is not intended to limit the invention to the specific embodiments illustrated.

FIG. 1 shows an accelerometer mounted by means of the mounting system of the present invention. The accelerometer of FIG. 1 inclues a case 12, a transducer 14 and a mounting ring 16. The case 12 includes a cylindrical sidewall 18, a bottom wall 20 and a flange 22. The flange 22 includes mounting holes 24 that are used to mount the case and accelerometer to a supporting structure.

The transducer 14 has a generally cylindrical shape and comprises two excitation rings 26 and 27 joined by bellyband 28. Here the transducer 14 is considered to be an accelerometer which is adapted to respond to accelerations along an axial disposed sensitive axis "S" by producing an electrical signal that indicates the direction and magnitude of such acceleration. The transducer 14 is mounted to the case 12 at excitation ring 27 by the mounting ring 16. As described below, the mounting ring 16 provides precise and stable alignment of the transducer 14, such that the transducer is not free to undergo translational or rotational movement with respect to the case. However, the mounting ring 16 does permit differential radial or volumetric thermal expansion or contraction between the transducer 14 and the case 12, and also serves to isolate the transducer from stresses that would otherwise result from distrotion of the case. Distortion of the case 12 may be caused by mounting the flange 22 on a surface that is not perfectly flat, or by differential thermal expansion between the flange and its support.

Figure 2:
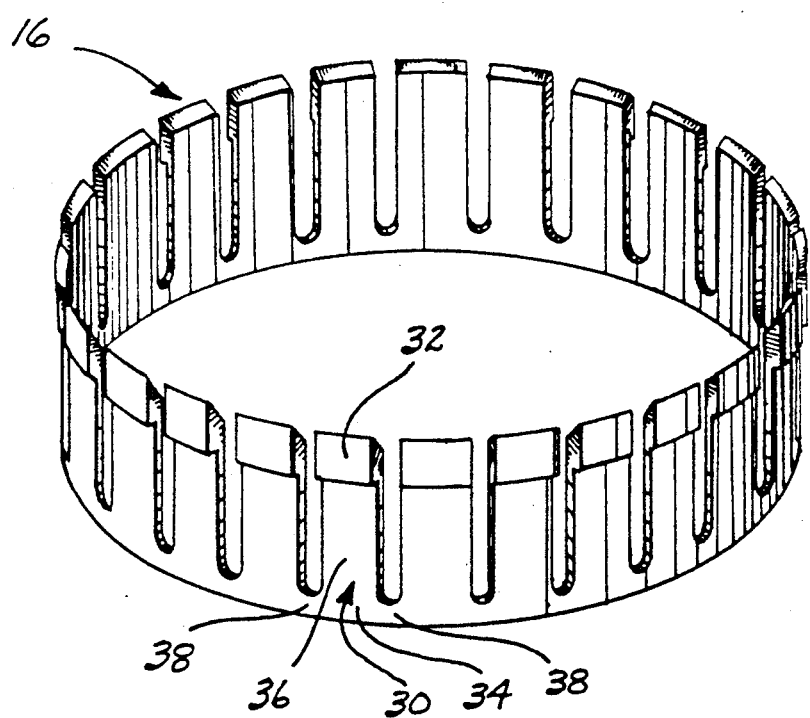
FIGS. 2 and 7 are perspective views of the mounting ring of FIG. 1.
Figure 8:
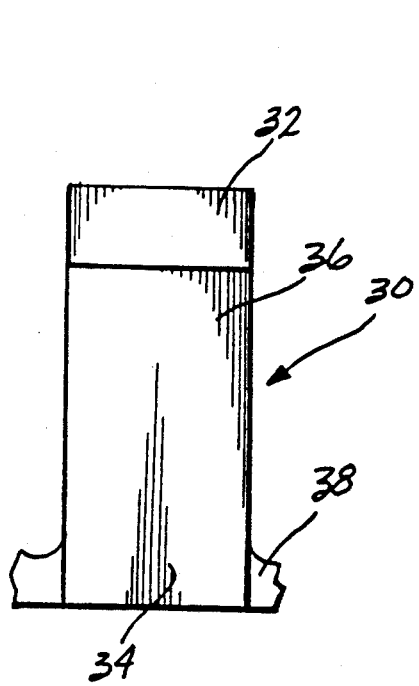
FIGS. 8 and 9 are fragmentary views of the mounting elements which form the embodiments shown in FIGS. 2 and 7.

The mounting ring 16 in FIG. 1 is illustrated in greater detail in FIG. 2. In this embodiment, the mounting ring 16 comprises a plurality of mounting elements 30 (see FIG. 8). Each mounting element comprises an upper end 32, a lower end 34 and a resilient intermediate portion or beam 36. As described below, in this embodiment, the upper ends 32 of the mounting elements 30 are attached to the case 12, and the lower ends 34 are attached to the transducer 14. The lower ends of each mounting element 30 are joined to the lower ends of adjacent mounting elements by bridge sections 38 (see FIGS. 6 and 8). The bridge sections thereby join the mounting elements into a single, generally cylindrical mounting ring 16, as is best illustrated in FIG. 2. It is not required for the practice of the present invention that the mounting elements be joined to one another by bridge sections 38. However, the use of bridge sections is preferred because it significantly facilitates manufacturing and assembly of the accelerometers.

Figure 4:
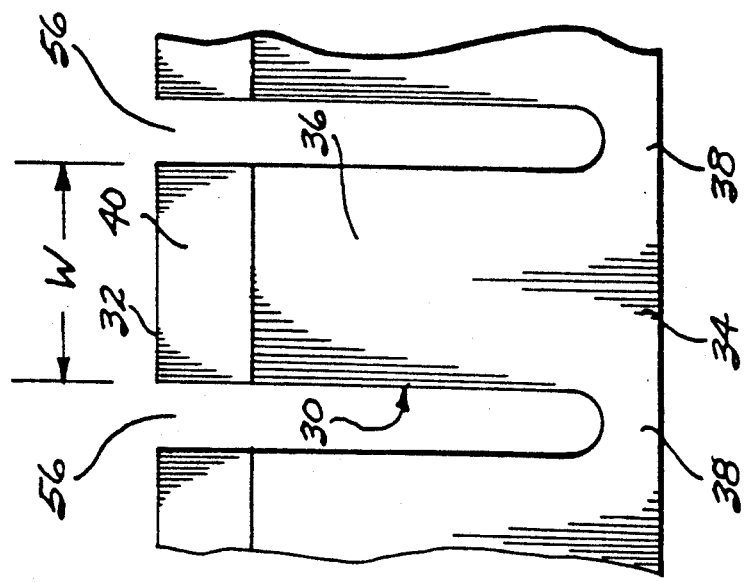
FIGS. 4 and 6 are side-elevational views of a portion of the mounting ring of the two embodiments described.
Figure 3:
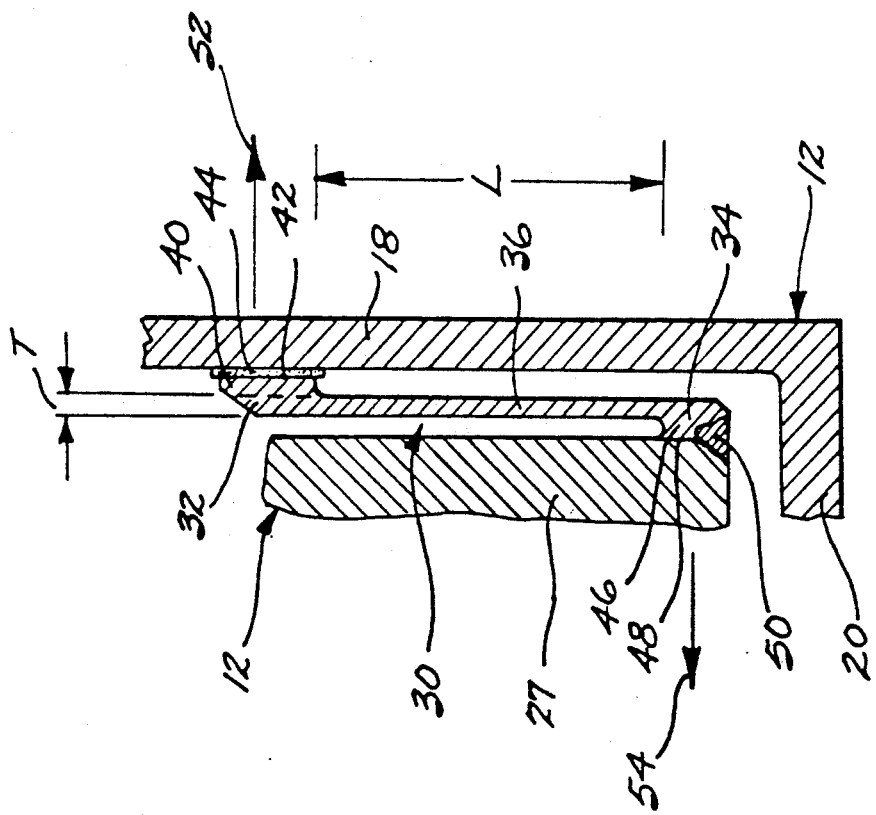
FIGS. 3 and 5 are cross-sectional views showing the connection of a mounting element between the transducer and case of the two embodiments described.

FIGS. 3 and 4 illustrate further details of the mounting elements and of the connection between the mounting elements and the transducer 14 and case 12. As best illustrated in FIG. 3, the upper end 32 of each mounting element 30 includes a pad 40 that includes an outwardly facing surface 42. This surface 42 preferably has a cylindrical contour that matches the contour of the adjacent inner wall 18 of the sidewall 18 of the case 12. The pad 40 is joined to the sidewall 18 by an adhesive layer 44. A suitable material for the adhesive layer 44 is a structural adhesive such as an epoxy resin. The lower end 34 of each mounting element 30 includes an inwardly projecting flange 46, having a cylindrical inner surface 48 that has a contour that matches the contour of the adjacent outer surface of the transducer 14. The cross-sections of bridge sections 38 (see FIG. 4) may be similar to the cross-sections of the flanges 46, such that the bridge sections, together with the lower ends 34 of the mounting elements 30, form a ring having a continuous, cylindrical inner surface. The radius of such inner surface is dimensioned to match the radius of the adjacent outer surface of the transducer 14. The mounting ring 16 is joined or bonded to the transducer 14 by a process, such as welding or brazing, that produces a rigid and integral bond between the mounting ring and the transducer 14.

FIG. 3 illustrates the use of weld joint 50 to create the bond between the flange 46 and the excitation ring 27. The point of attachment of the transducer 14 to the mounting ring 16 is preferably spaced as far as possible from the flange 22 of the case 12, in order to minimize the transmission of stress from the case flange to the transducer.

It is an important aspect of the present invention that the mounting ring 16 is attached to the transducer 14 in such a way that minimal stress is produced when the transducer and mounting ring undergo thermal expansion or contraction. This result is achieved by fabricating at least the lower ends 34 and the bridge sections 38 from a material that has a coefficient of thermal expansion approximately equal to the coefficient of thermal expansion of the transducer 14, and in the particular embodiment shown in the drawings, of the excitation ring 27. An intervening layer of material between the mounting ring and the transducer (e.g., an adhesive layer) should generally not be used unless the intervening layer has a coefficient of thermal expansion approximately equal to that of the transducer and mounting ring. Similarly, where a welding or brazing process is used to join the mounting ring to the transducer, any filler metal or brazing material used should be either very thin or have a coefficient of thermal expansion matched to the coefficient of thermal expansion of the transducer and mounting ring. In a preferred embodiment shown in the drawings, the mounting ring 16 is entirely fabricated from a metal identical to the metal forming excitation ring 27, and is welded to the excitation ring part of the transducer 14 without the use of a filler metal. Because of its low coefficient of thermal expansion, Invar, a 36% nickel-iron alloy, is a particularly suitable metal with which to form the excitation ring 27 and the mounting ring 16.

Figure 6:
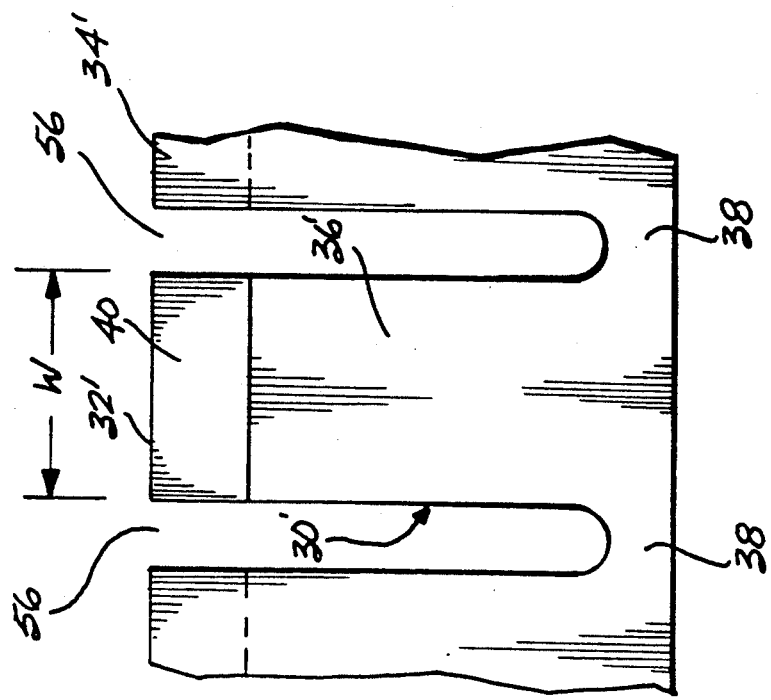

In general, it may not be practical to match the coefficient of thermal expansion of the mounting ring 16 to the coefficient of thermal expansion of the case 12 or the adhesive layer 44. Therefore, the upper ends 32 of the mounting elements 30 are preferably not abutting or joined to one another, but are instead spaced apart by gaps 56 (FIGS. 4 and 6). Such gaps eliminate or greatly reduce the high hoop stress that would otherwise occur due to differential thermal expansion or contraction between the mounting ring 16, the adhesive layer, and the case 12. Similar gaps are not required between lower ends 34 of mounting elements 30, because the coefficient of thermal expansion of the mounting ring is matched to that of the excitation ring to which the mounting ring is attached.

Each intermediate portion or each beam 36 is dimensioned such that it has a compliant axis oriented in the radial direction (indicated by arrows 52 and 54 of FIG. 3). The compliant axis of each beam preferably intersects the axial centerline of the transducer. The beam 36 is preferably dimensioned such that it is essentially rigid in directions normal to arrows 52 and 54 (i.e., along the length L of the beam and in the directions into and out of the plane of the drawing in FIG. 3). Differential radial or volumetric thermal expansion (or contraction) between the transducer 14, the mounting ring 16 and the case 12 therefore results in differential movement between the transducer and case along the compliant axes of each beam. The beams, therefore, flex to take up the differential movement without transmitting significant stress to the transducer 14. However, the rigidity of the beams 36, in a direction perpendicular to their compliant axes, results in a mounting system in which the transducer is not free to rotate or to undergo overall translational movement with respect to the case 12. Therefore, in the case of an accelerometer transducer, the sensing axis of the accelerometer is preferably aligned with or in the stiffest or most rigid axis of the beams (i.e., beams in direct compression). This minimizes frequency response errors and phase shift error due to suspension system mechanical transmissibility.

The required compliant characteristics of each beam 36 are preferably achieved by making the width W (see FIG. 6) and length L (see FIG. 5) of each beam substantially greater than the thickness T (see FIG. 5) of that beam. The width W of each beam 36 must, of course, be limited (with respect to the circumference of the mounting ring 16) such that each beam is essentially planar and compliant in a radial direction. In general, width-to-thickness ratios between about 10:1 and 20:1 are most suitable, although other ratios may be used, depending on the nature of the transducer and the mounting ring materials. One preferred mounting ring 16 comprises twenty-four mounting elements, the beam of each mounting element having a length-to-thickness ratio of about 21:1, and a width-to thickness ratio of about 12:1. The distance between adjacent mounting elements (i.e., the width of gaps 56) should be large enough to avoid interference between the beams due to thermal expansion or seismic inputs. Referring to FIG. 3, the distances that the pad 40 and flange 46 extend from the plane of beam 36 should similarly be large enough to avoid interference between the beams, the transducer 14 and the case 12.

Figure 7:
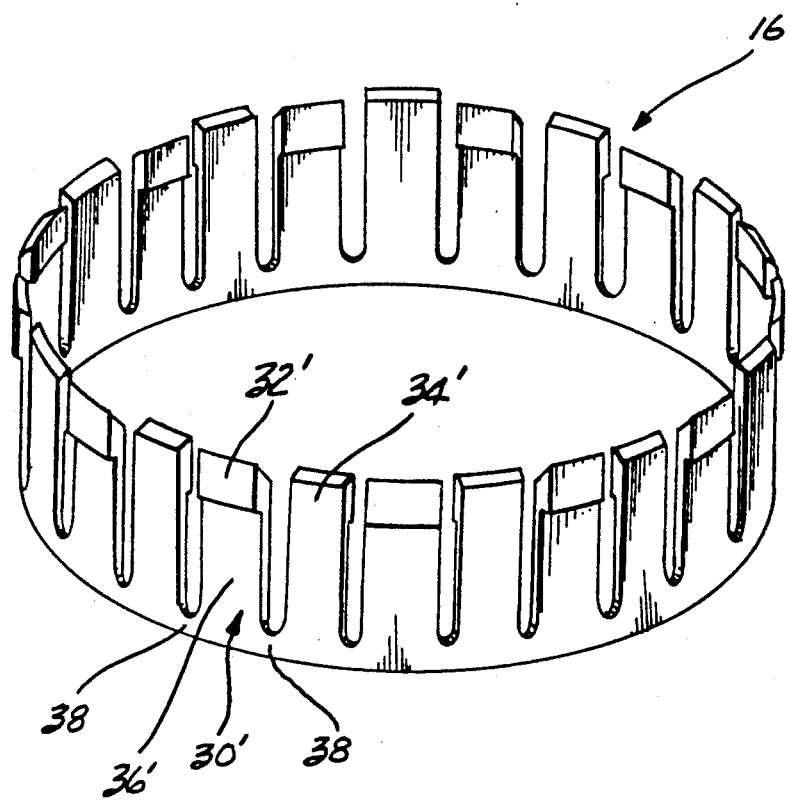
Figure 9:
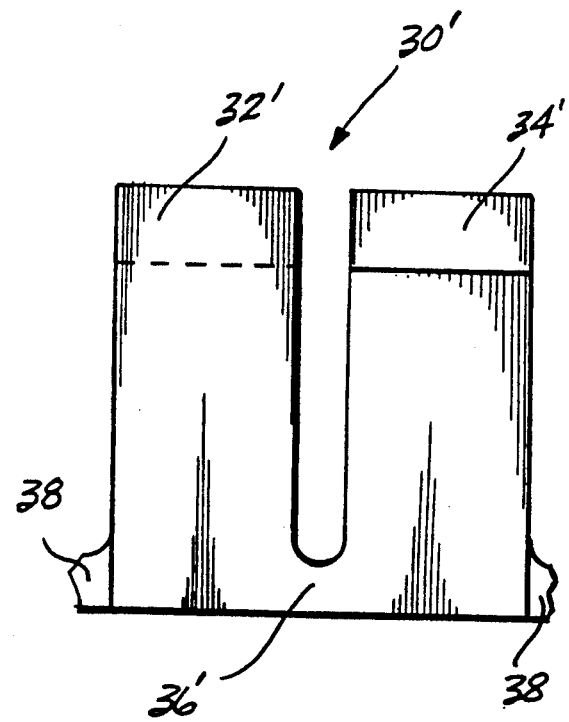

FIG. 7 illustrates another embodiment of the invention. Here, the mounting ring 16 comprises a plurality of mounting elements 30'(see FIG. 9). Each mounting element 30' comprises a left end 32', a right end 34' and a resilient intermediate portion or beam 36'. Much as in the previous embodiment, the left end 32' of each mounting element 30' is attached to the case 12, and the right end 34' is attached to the transducer 14. Here, the bridge sections 38 join the right and left ends of two adjacent mounting elements. Similarly, the bridge sections thereby join the mounting elements into a single, generally cylindrical mounting ring 16, as is best illustrated in FIG. 7.

Figure 5:
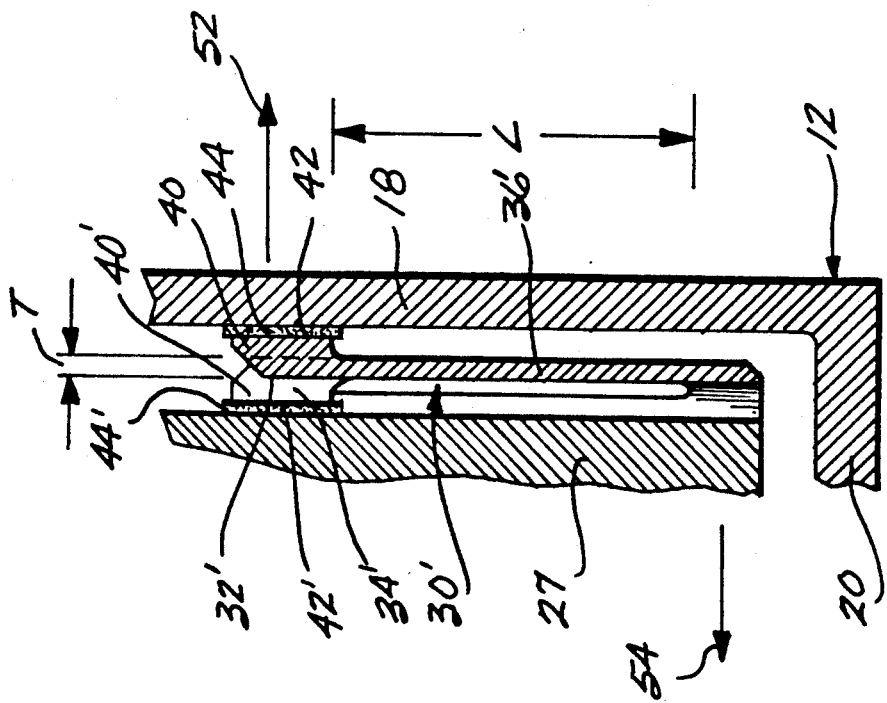

FIGS. 5 and 6 illustrate further details of the mounting elements 30' and of the means by which the mounting elements are connected to the transducer and case. Here, the right end 34' and the left end 32' of each mounting element 30' lie generally in the same plane (i.e., a horizontal plane perpendicular to the cylindrical axis of the transducer 14). As best illustrated in FIG. 5, each end 32' and 34' includes a pad 40 and 40'. Here, the left and 32' has a pad 40 that includes an outwardly facing surface 42. The right end 34' has a pad 40' that includes an inwardly facing surface 42'. Both surfaces 42 and 42' preferably have a cylindrical contour that matches the contour of the adjacent inner wall of the side wall 18 of the case 12. Each pad may be joined to the adjacent side wall (i.e., 40 with 18) by an adhesive layer 44 or 44' or other means. It should be observed that each intermediate portion or beam 36' is attached to either the case 12 or the transducer 14, but not both. This feature, combined with the preferred compliant characteristics of the beam 36', reduces the amount of the external stress applied to the transducer.

While the preferred embodiments of the invention have been illustrated and described, it should be understood that variations will be apparent to those skilled in the art. For example, electrical isolation has not been discussed but is one reason for using a mounting element made from a glass matt bound epoxy preform. Isolation of the transducer eliminates ground loops and, in some cases, allows the case to be a driven part of the detector circuit. Accordingly, the invention is not to be limited to the specific embodiments illustrated and described, and the true scope and spirit of the invention are to be determined by reference to the following claims.

We claim:

1. An accelerometer assembly, comprising:
   a generally cylindrical accelerometer having a cylindrical axis and a cylindrical mounting section;
   a supporting case;
   a mounting assembly including a plurality of mounting elements, each mounting element having first and second ends and a resilient generally flat planar axially aligned intermediate portion, said first end comprising a flange extending radially inwardly from said intermediate portion welded to the accelerometer, said second end being connected to the case and extending out of the plane of said intermediate portion, at least said first end being composed of a substance that has a coefficient of thermal expansion approximately equal to the coefficient of thermal expansion of the accelerometer, said intermediate portion of each mounting element being adapted to provide a low resistance to relative movement between the accelerometer and the case in a radial direction perpendicular to the plane of each mounting element and a high resistance to relative movement between the transducer and the case in directions in the plane of each mounting element; and
   said mounting assembly further including a plurality of bridge sections joining together adjacent mounting elements such that said first end flanges and bridge sections form a closed generally ring-shaped band, said bridge sections being composed of a substance having a coefficient of thermal expansion approximately equal to the coefficient of thermal expansion of the accelerometer, said band defining a radially inwardly facing cylindrical mounting surface which is generally equal in radius to the radius of said cylindrical accelerometer and which is welded to the transducer at said mounting section, said bridge sections and said first end flanges which form said mounting surface being composed of the same material,
   whereby the stress imposed on the transducer by differential thermal expansion or contraction between the transducer and the case is reduced and misalignment between the transducer and the case is reduced relative to a mounting system not having an intermediate portion.

2. The accelerometer assembly of claim 1, wherein each intermediate portion comprises a beam having one compliant axis and two non-compliant axes which are perpendicular to each other and to said compliant axis, each beam having its compliant axis disposed in said radial direction and its length dimension measured perpendicular to said radial direction.

3. The accelerometer assembly of claim 1, wherein said substance is INVAR.

4. The accelerometer assembly of claim 2, wherein the width and length of each beam are substantially greater than the thickness of each beam, such that the compliant axis of the beam corresponds to the thickness dimension; and wherein the thickness dimension of the beam is aligned with the radial direction, whereby the beam has a relatively small resistance to differential thermal expansion between the transducer and the case and said beam has a high resistance to overall translation and rotation of the transducer with respect to the case.

5. The accelerometer assembly of claim 1, wherein said transducer defines a vertical axis, and wherein said first end and said second end are disposed vertically apart from each other.

6. An accelerometer assembly, comprising:
a generally cylindrical accelerometer having a cylindrical axis and a cylindrical mounting section;
a supporting case;
a mounting assembly including a plurality of mounting elements, each mounting element having first and second ends and a resilient generally flat planar axially aligned intermediate portion, said first end being connected to the accelerometer, said second end being connected to the case and extending out of the plane of said intermediate portion, a line joining said second ends of said mounting elements being disposed in a horizontal plane which is generally perpendicular to said cylindrical axis, at least said first end being composed of a substance that has a coefficient of thermal expansion approximately equal to the coefficient of thermal expansion of the accelerometer, said intermediate portion of each mounting element being adapted to provide a low resistance to relative movement between the accelerometer and the case in a radial direction which is perpendicular to the plane of each mounting element and a high resistance to relative movement between the transducer and the case in directions in the plane of each mounting element; and
wherein said mounting assembly further includes a plurality of bridge sections joining together adjacent mounting elements such that said mounting elements and bridge sections form a band, said bridge sections being composed of a substance having a coefficient of thermal expansion approximately equal to the coefficient of thermal expansion of the accelerometer,
whereby stress imposed on the accelerometer by differential thermal expansion or contraction between the accelerometer and the case is reduced and misalignment between the accelerometer and the case is reduced relative to a mounting system hot having an intermediate portion.

7. The accelerometer assembly of claim 6, wherein said first end extends out of plane of said intermediate portion in a direction opposite said second end.

8. A mounting system for supporting a generally cylindrically shaped accelerometer in spaced alignment with a generally cylindrically shaped supporting case, comprising:
a plurality of mounting elements, each mounting element having two angularly spaced apart ends joined by a resilient intermediate portion, one end being radially inwardly directed and being adapted to be connected to the accelerometer and the other end being radially outwardly directed and being adapted to be connected to the case, said one end and said other end being angularly separated from each other by said intermediate portion so as to define a generally axially aligned gap, said intermediate portion defining an axially aligned beam having one compliant axis and two non-complaint axes which are perpendicular to each other and to said compliant axis; and
a plurality of bridge sections for joining together adjacent mounting elements in a closed ring such that said mounting elements and said bridge sections form a generally castellated band, at least one of said bridge sections and said intermediate portions of each mounting element being composed of a substance having coefficient of thermal expansion approximately equal to the coefficient of thermal expansion of the accelerometer.

9. The mounting system of claim 8, wherein said one end and said other end each axially extends away from said intermediate portion in the same direction by approximately the same amount, whereby said two ends generally lie in a plane perpendicular to the axis of the accelerometer.

10. The mounting system of claim 8, wherein said bridge sections separate adjacent mounting elements so as to define an opening generally equal to said gap.

11. The mounting system of claim 8, wherein said accelerometer defines a force sensing axis; and wherein one of said two non-compliant axes is generally parallel to said force sensing axis.

* * * * *